(12) United States Patent
Uchida et al.

(10) Patent No.: US 6,317,570 B1
(45) Date of Patent: Nov. 13, 2001

(54) FIELD SERVICE SYSTEM FOR IMAGE FORMING DEVICES

(75) Inventors: Yuki Uchida, Wayne; Toshihiro Kudara, River Edge, both of NJ (US); Hitoshi Sekine, Sunnyvalle, CA (US); Hisashi Ishijima, Fort Lee, NJ (US)

(73) Assignees: Ricoh Company, Ltd., Tokyo (JP); Ricoh Corporation, West Caldwell, NJ (US)

( * ) Notice: Subject to any disclaimer, the term of this patent is extended or adjusted under 35 U.S.C. 154(b) by 0 days.

(21) Appl. No.: 09/710,615

(22) Filed: Nov. 9, 2000

(51) Int. Cl.[7] .................................................. G03G 15/00
(52) U.S. Cl. ................................ 399/8; 399/9; 399/10; 399/18; 399/81
(58) Field of Search ........................ 340/825.06, 825.16; 709/217, 218, 219, 223, 226, 227, 229; 399/8, 9, 18, 81

(56) References Cited

U.S. PATENT DOCUMENTS

| | | | |
|---|---|---|---|
| 5,392,095 | * | 2/1995 | Siegel ........................................ 399/8 |
| 5,715,496 | | 2/1998 | Sawada et al. . |
| 5,802,429 | * | 9/1998 | Yamashita ................................ 399/8 |
| 6,032,001 | * | 2/2000 | Miyawaki ................................ 399/8 |

* cited by examiner

Primary Examiner—Arthur T. Grimley
Assistant Examiner—Hoang Ngo
(74) Attorney, Agent, or Firm—Cooper & Dunham LLP

(57) ABSTRACT

A method and a system for facilitating service for image forming devices such as copiers, fax machines and printers. A main service center receives a service request from a user, such as via an Internet home page that the main service center maintains. Based on the service requests and databases for user information and information regarding local service centers, the main service centers identifies the local service center(s) that are suitable for meeting the service request, in term of the type of devices and territories they service and other factors. The user, the main service center, and the one or more local service centers transmit information among themselves to track the service request and responses by the user and one or more local service centers and to ensure that the requested service is appropriately supplied.

30 Claims, 10 Drawing Sheets

| Service Company | Territory | Copier/Printer/Fax Manufacturer | Model Name | Service Item | User |
|---|---|---|---|---|---|
| A Corp. | West | R Co., Ltd. | FTxxxx | All | S Inc.<br>T Co., Ltd.<br>V Corp. |
| | | | Aficio xx | All | S Inc.<br>W Corp. |
| | | | Ipsio oo | Supply | S Inc.<br>S Corp.<br>A Corp.<br>B Co., Ltd. |
| | | R Co., Ltd. | xxoo | Toner | C Corp.<br>D Corp. |
| | | X Inc. | ooox | Supply | C Corp.<br>C Inc. |
| | | | xxoo | Malfunction | X Co., Ltd. |
| E Inc. | East | R Co., Ltd. | FTxxoo | All | Z Corp. |

FIG. 3

| User Name | User Address | E-mail | Phone | Fax | Manufacturer | Model Name | Manufactured Year | Service Company | Service Item | Service Date | Service Completion Date |
|---|---|---|---|---|---|---|---|---|---|---|---|
| S Inc. | 1234 St. W. Call, NJ 00111 | sinc.---- | (123) 456.7890 | (123) 456.7890 | R Co., Ltd. | FTxxxx | 1997 | A Corp. | Drum | 1/1/98 | 1/2/98 |
| | | | | | R Co., Ltd. | Aficio xx | 1998 | A Corp. | Toner Empty | 5/1/98 | 5/1/98 |
| C Corp. | 1233 Ave. W., NJ 00119 | ccorp.---- | (124) 567.8901 | (124) 678.9012 | S Co., Ltd. | xxoo | 1995 | A Corp. | Toner Empty | 12/1/96 5/1/97 6/1/98 | 12/1/96 5/1/97 6/2/98 |
| | | | | | X Inc. | ooox | 1999 | A Corp. | Paper End | 6/1/99 | 6/1/99 |
| Z Corp. | 1234 Ave. E, NJ 00111 | zcorp.---- | (125) 678.9012 | (125) 678.9013 | R Co., Ltd. | FTxxoo | 1999 | E Inc. | Cleaner | 7/1/99 | 7/2/99 |

FIG. 4

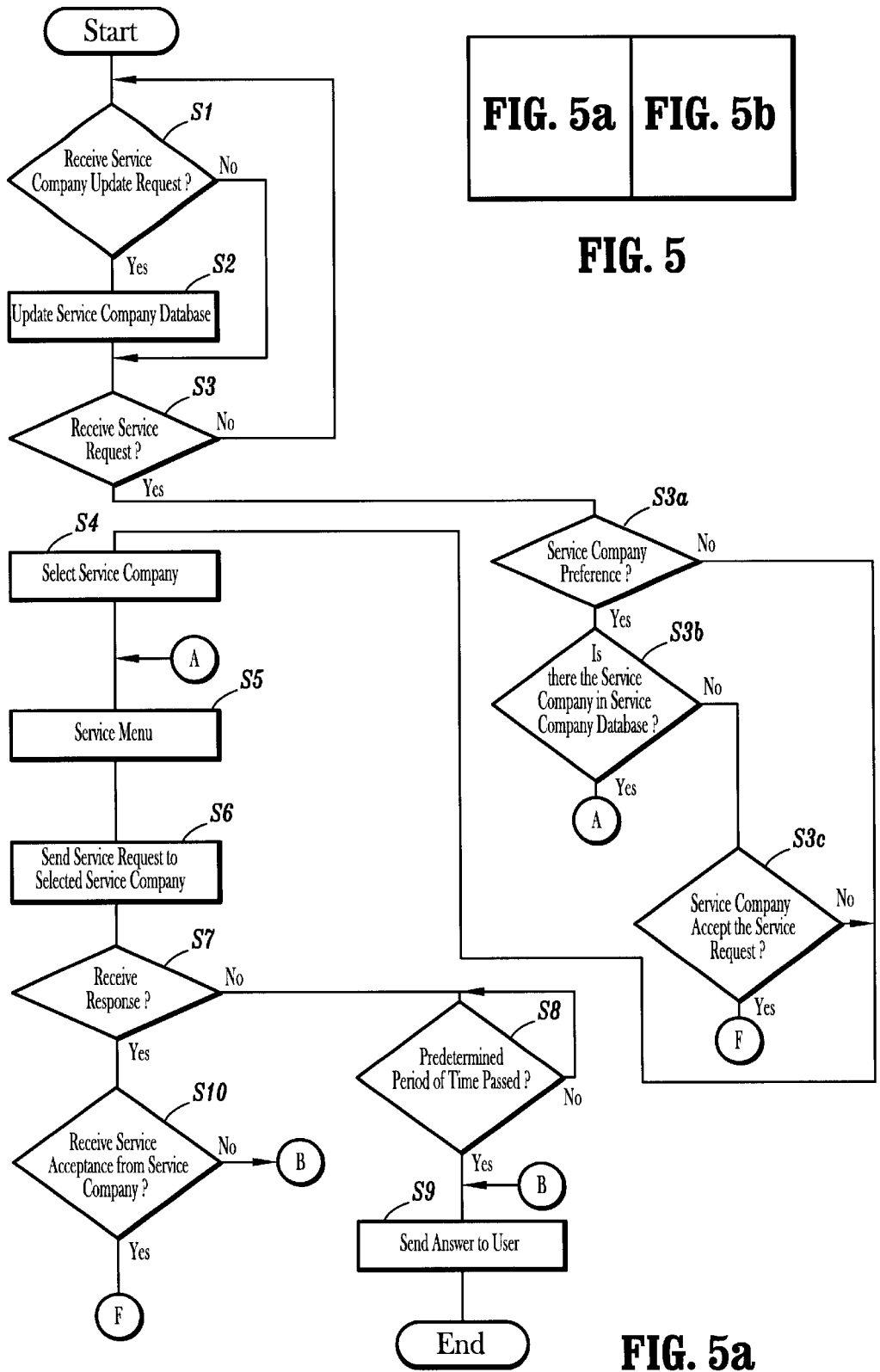

Service Request Menu for User

User Name
Company Name
Address
Tel
Fax
E-mail
Maker
Model
Manufacturing Year
Service Item
      -Toner End
      -Paper End
      -Malfunction
           -Jam
           -Stray Sound
           -No Image
           -Image Problem
           -Other: (specify)
Service Company Preference
Account Info. [                ]

[ Send ]   [ Cancel ]

FIG. 6

Service Menu

User Name
Address
Service Company
Service Date & Time
Maker
Model
Manufactured Year
Service Item

| Please Send Final Service Request | Cancel |

FIG. 7

FIELD SERVICE SYSTEM FOR IMAGE FORMING DEVICES

FIELD

This patent specification is in the field of systems and method for servicing image forming devices such as copiers, facsimile machines, printers and other devices, including providing parts and supplies therefor.

BACKGROUND

Current image forming devices tend to be reliable but still may need occasional service or parts or accessories, and regularly need supplies such as paper, toner, and other consumables. The ultimate user may have a convenient source for meeting some but not necessarily all the needs that may arise in the life cycle of the image forming device, and some users may not even know where and how to conveniently secure service, parts or supplies for the particular model that may need any service. It is believed desirable to provide a system and method for assisting users in this respect.

There are systems that connect image forming devices with a central location for remote diagnostics and service. This, however, requires making a prior arrangement with a particular service provider, typically on the basis of a service contract for specified image forming devices and for specified periods of time, and may not be suitable to all end users. One existing system is discussed in U.S. Pat. No. 5,715,496, hereby incorporated by reference herein, and utilizes a control unit connected over communication lines with a plurality of image forming devices such as copiers that are at locations remote from that of the control unit, and with a plurality of terminal units at service centers that also can be remote from the control unit. Upon an event indicative or predictive of a need for service detected at an image forming device, the device communicates information regarding such event to the remote control unit. Based on analyzing this information, the control unit may communicate with a service center to request or order an action to be taken, such as sending service personnel to the remote image forming device.

While such earlier systems can be effective and efficient where longer term arrangements can be made for servicing and/or supplying consumables and parts for certain imaging devices, it is believed that a need still exists for a system that can benefit a user who has no such prior arrangements when a need arises for service, parts or supplies.

SUMMARY

This patent specification describes a system and a method particularly suitable for users of imaging devices who desire to make efficient and effective arrangements for service (including repairs, parts, and/or supplies) when the need arises or when they otherwise elect.

In a non-limiting example of an embodiment, a main service center communicates when needed with a user side that includes a number of remotely located imaging devices as well as with a local service center side that includes a number of local service centers that also can be remote from the main service center. The various locations can communicate with each other over communication lines such as Internet connections, and/or some other network such as a wide area network (WAN) and/or the telephone switching system. When looking for service, including repairs, supplies, and/or parts, the user establishes a connection with the main service center, for example via an Internet appliance such as a personal computer or some other device that can access a home page of the main central service, or in some other way. Based on information the user provides through this connection, the main service center selects one or more local service centers particularly suited to the current needs of the user, and facilitates the delivery of the appropriate service. The system can work with imaging devices of different types and models, made by different manufacturers, and with local service centers that are of different types and where any one local service center may not service or supply all of the types or models of imaging devices making use of the system.

BRIEF DESCRIPTION OF THE DRAWINGS

FIG. 3 illustrates an example of information regarding the local service centers maintained at the main service center.

FIG. 4 illustrates information regarding the users maintained at the main service center.

FIG. 6 illustrates a menu for a request from a user.

FIG. 7 illustrates an example of a service menu transmitted to a local service center.

DETAILED DESCRIPTION OF PREFERRED EMBODIMENTS

Figure 1:
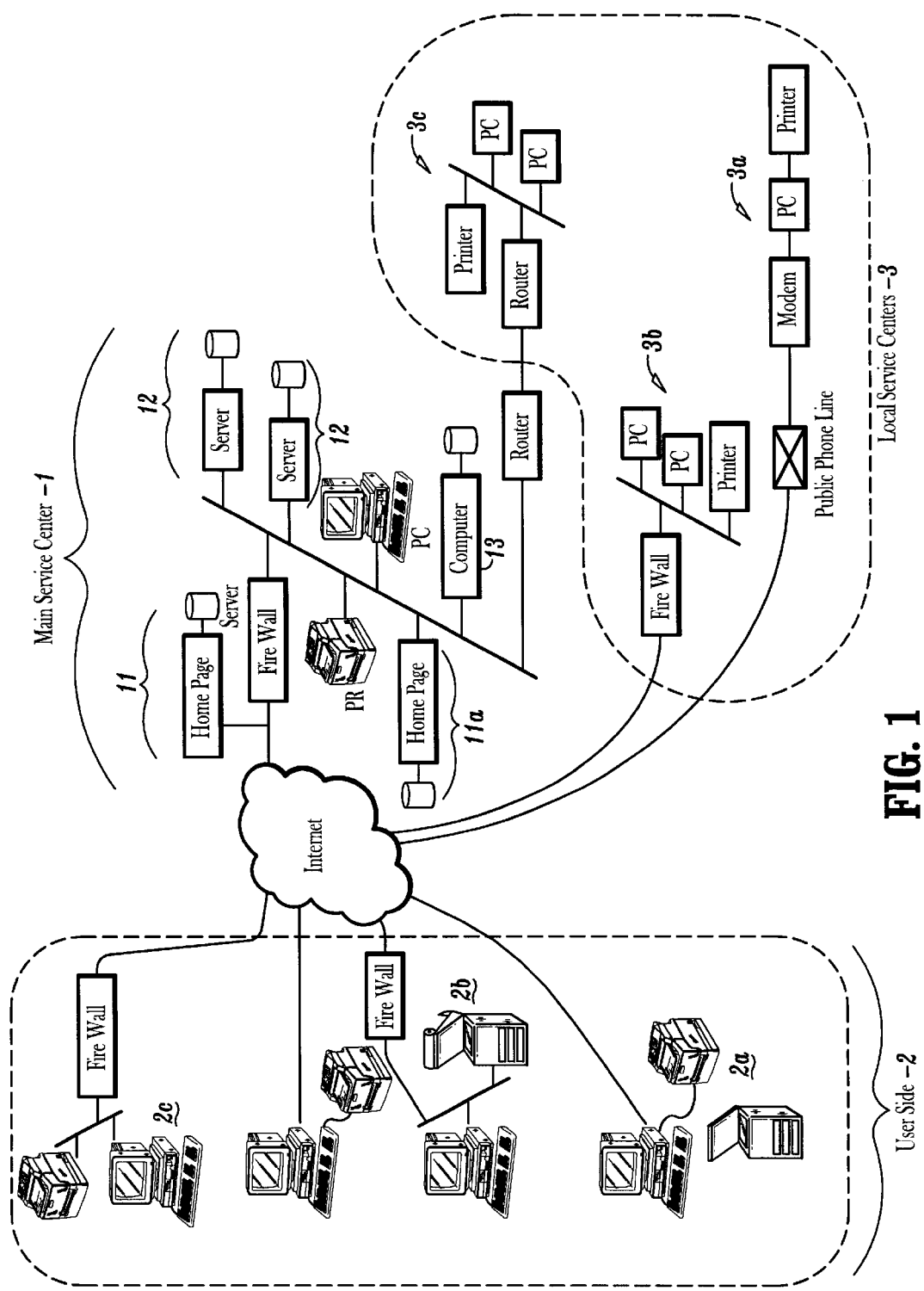
FIG. 1 illustrates an embodiment of a system selectively connecting a main service center with a user side including a number of remotely located imaging devices and with a local service side including a number of remotely located local service centers.

Referring to FIG. 1, a main service center 1, a user side 2, and local service centers 3 are selectively connected with each other via the Internet, a wide area network (WAN), the public telephone switching network, and/or in some other way, to selectively exchange information. Considering an Internet connection as a non-limiting example, the main service center 1 has a home page server 11 that can exchange information with users 2a, 2b, etc. at a user side 2 and with local service centers 3a, 3b, etc. at a local service centers side 3. The main service center 1 further comprises one or more data bases 12 that store information regarding users and local service centers, a computer 13 with appropriate storage and programs to control the overall operation of the system and carry out the functions described below, and may still further comprise a personal computer PC, a printer PR and one or more additional home page servers such as 11a. The various facilities at the main service center 1 can be interconnected through a local area network (LAN) or in some other way and can be configured in different ways to suit different needs.

The user side 2 comprises devices such as, without limitation, various models of copiers, printers, and facsimile machines that can be made by different manufacturers. Each imaging device at the user side 2 further includes, or at least selectively has the use of, a communication device such as a personal computer, an Internet appliance, or some other device that can establish suitable communication with the main service center 1 to carry out the functions described below. Firewalls or other protection facilities can be provided as illustrated. While an Internet connection is illustrated between the user side 2 and the main service center 1, other or additional types of connections are possible and contemplated within the scope of the disclosed system and process.

The local service centers 3 also can be selectively or otherwise connected with the main service center 1, through one or more types of connections. For example, as illustrated local service center 3a can be connected via a public phone line and can include a modem, a personal computer and a printer. Local service center 3b can be connected through the Internet and provided with a firewall facility and one or more personal computers PC and one or more printers, and local service center 3c can be connected through one or more routers and can also include one or more personal computers PC and one or more printers. Alternatively, two or more local service centers 3 can be selectively or otherwise connected with the main service centers 1 through the same type connection.

Figure 2:
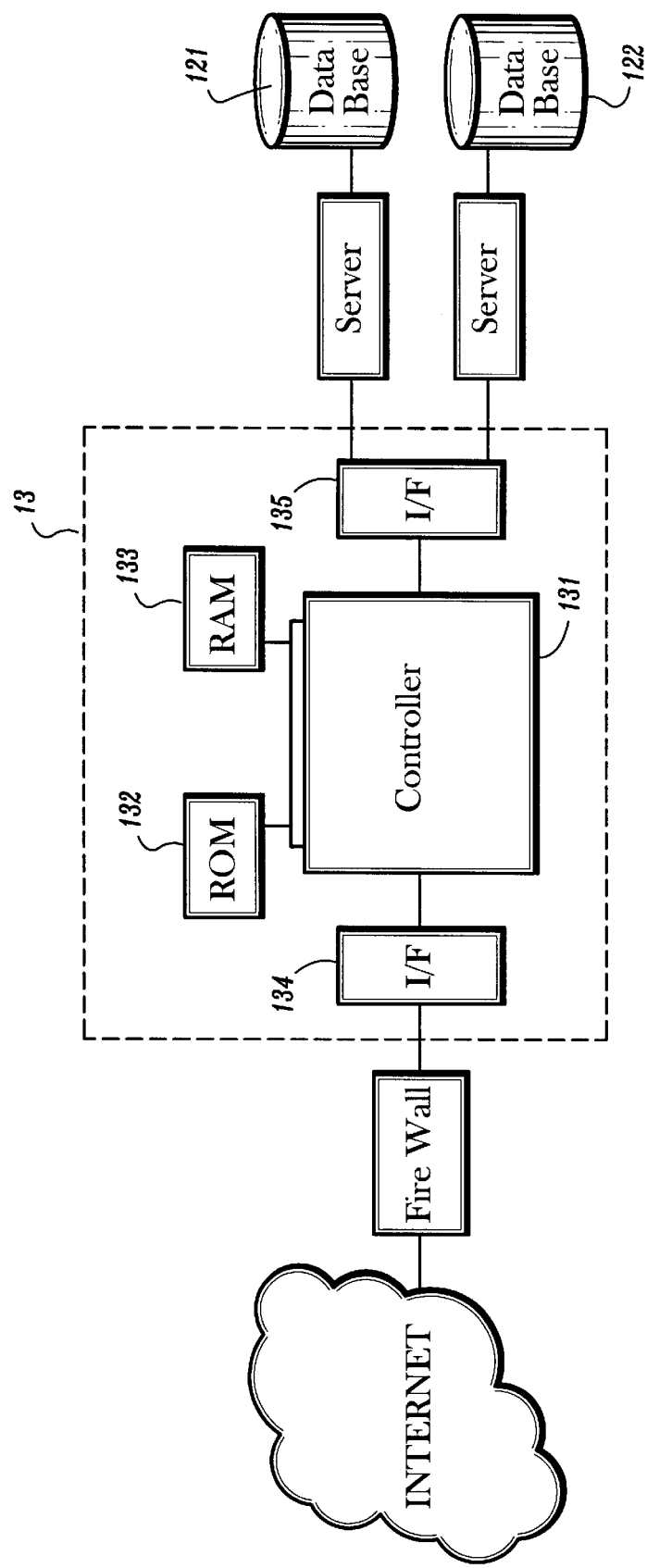
FIG. 2 illustrates the main service center in greater detail.

FIG. 2 illustrates an example of the main service center 1 in greater detail. As seen, the computer 13 comprises a controller 131 that controls the operation of computer 13, one or more data bases such as 121 and 122, a memory such as a read-only memory (ROM) 132 for storing control programs, a memory such as a random access memory (RAM) 133 for storing programs and data, an interface circuit 134 for communicating with the Internet, preferably through a firewall, and an interface circuit 135 for communicating with server databases such as 121 and 122. Different memories can be used to suit different configurations and memories and interface circuits can be combined into fewer number of units or into one unit.

FIG. 3 illustrates information regarding the local service centers 3 that can be stored in a server database such as 121 at the main service center 1. As indicated in FIG. 3, such information can include, for example, the names of local service centers (Service Company column), the territories covered by the respective local service centers (Territory column), the manufacturers whose products the respective local service centers can service (Copier/Printer/Fax Manufacturer column), the model or other identification of devices that can be serviced (Model Name column), what services the local center can provide for the respective model devices, such as supplies only, toner only, repairs only, all services and parts and supplies, service for malfunctions only, etc. (Service Item column), and the names of users of respective devices that the local center has serviced before or users who are otherwise known to the local service center (User column). Additional or different information can be stored in databases such as 121 at the main service center 1, and the stored information can be updated or otherwise changed as desired, for example as new local service centers 3 or users or devices or services are added or deleted.

FIG. 4 illustrates information regarding the users that can be stored at databases such as 122 at the main service center 1. Such information is generated typically when a user contacts the main service center, or when a local service center provides service to a user, but can be generated in other ways as well. The user-oriented information stored in a database such as 122 can include, for example, names of users (User Name column), location addresses of users (User Address column), e-mail addresses of users (E-mail column), phone numbers of users (Phone column), fax numbers of users (Fax column), manufacturers of the respective one or more image forming devices each user has (Manufacturer column), model names or other designations of the respective image forming devices (Model Name column), year of manufacture or some other time-related designation for the respective image forming devices (Manufactured Year column), the identity of the local service center(s) that the user has utilized in the past, or has contacted, or has some other association with (Service Company column), the service items that the user has received in the past or that are otherwise associated with the user (Service Item column), the time or a service request for the image forming device or some other time-related event (Service Date column), and the time the service was completed or some other event took place (Service Completed column). Additional and/or different information can be included, and the information in database 122 can be updated or otherwise changed, for example as users are added or deleted or services are performed.

Figure 5B:
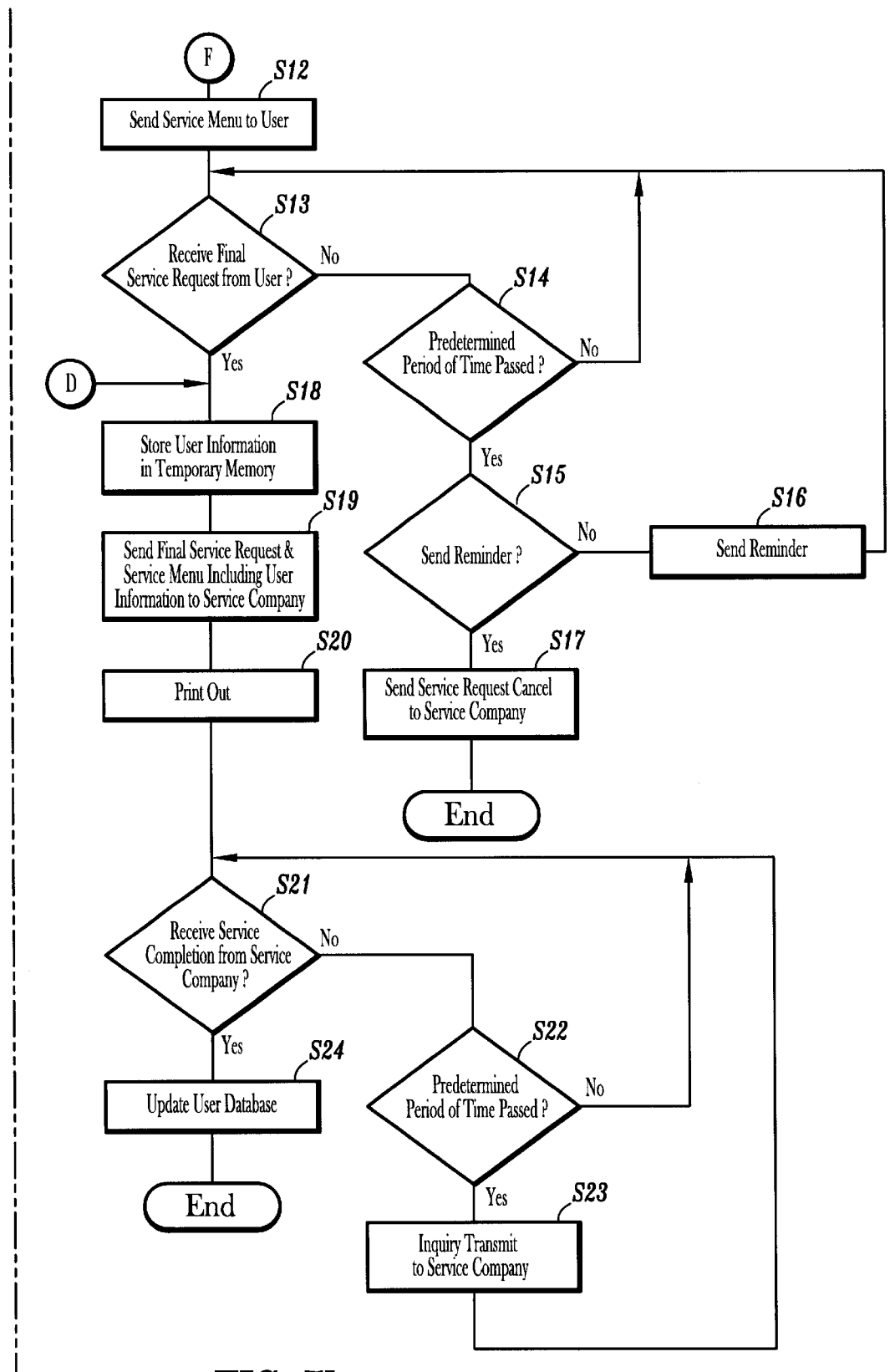
FIG. 5 is a flow chart illustrating an example of steps carried out in the system of FIG. 1.

FIG. 5 illustrates an example of steps carried out in practicing a non-limiting embodiment. As an overview, a user at user side 2 transmits a request to the main service center 1, for example through a web home page of the main service center. Based on information about the user and pertinent image forming device(s) available from the user's request and based on information stored at the main service center 1, the computer 13 at the main service center 1 identifies, if possible, one or more local service center 3 that can meet the service request. The main service center 1 then transmits the service request and any additional information that may be pertinent, to the identified local service center(s) 3. One or more of the identified local service centers 3 then transmit information to the main service center 1, including information as to whether they can meet the user's request. The main service center 1 determines which local service center(s) 3 would be most suitable to meet the user's request, and transmits information regarding the so-selected recommended local service center(s) to the user. Upon the user's approval and/or choice of a local service center, the main service center 1 then transmits a finalized user request to the selected local service center 3, together with information that can include a service request and a service menu that can in turn include user information and information regarding desired service and time parameters. The selected local service center 3 eventually transmits to the main service center 1 information regarding the completed service or other response to the user's request.

Referring to the flow chart of FIG. 5, the illustrated steps are carried out under control of the computer 13 and information from databases such as 121 and 122. After the illustrated process starts, at step S1 the computer 13 determines if a request has been received to update or otherwise change the information in database 121 (regarding local service centers 3) and, if the answer is yes, at step S2 the controller 131 updates the information in database 121, for example by adding or deleting a local service center 3 or by changing the list of image forming devices that can be serviced, and the process returns to step S1. If the answer at step S1 is no, the process goes to step S3, which determines if the main service center 1 has received a request for service from a user of an image forming device, e.g., via an Internet home page. If the answer at step S3 is yes, the process goes to step S3a to determine if there is a preferred local service center for that user's request, for example if the user has specified a preferred local service center. If the answer at step S3a is yes, the process determines at step S3b whether the preferred local service center 3 is among those in the database 121 at the main service center 1. If the preferred local service center is in database 121, the process moves to step S4, where that local service center is selected to meet the user's request. If step S3*b* determines that the local service center the user prefers is not in database 121, the main service center 1 contacts that preferred local service center, for example by a telephone call. If step S3*c* determines that the contacted local service center is able to meet the user's request and would accept the request (based on pre-stored information and/or a specific response from the local to the main service center, such as in response to sending a service menu as illustrated in FIG. 7), the process goes to step S12, discussed below. The main service center 1 can add the relevant information regarding that local service center to the database 121, for example by an operator keying in the information. If there is no preferred local service center (a no answer at step S3*a*), or the preferred local service center does not accept or cannot meet the user's request (a no answer at step S3*c*), the process goes to step S4, where the controller 131 selects at least one local service center 3 based on information in the service request from the user and on information in database 12 of the main service center 1. If two or more local service centers can meet the user's requests, step S4 can select plural local service centers 3. In this example of an embodiment, the main service center 1 automatically selects the local service center(s) suitable for meeting a user's request. An alternative is to display a user's request at the main service center, and/or enter the information regarding the user's request manually at the main service center 1, and/or make a manual selection of one or more suitable local service centers.

FIG. 6 illustrates an example of a user request menu. The menu can be displayed at the user's location, and the user can fill in blanks and/or check entries as needed, and transmit the information to the main service center 1, for example by clicking on a send button on a display and using Internet facilities to transmit to the main service center 1.

Returning to FIG. 5, at step S5 the computer 131 at the main service center processes information such as received from a user menu form such as illustrated in FIG. 6 and, based on information in the menu and information from database 121 and or other databases, at step S6 sends a detailed service request to the selected local service center(s) 3. This detailed service request can include a service menu such as illustrated in FIG. 7.

Referring to FIG. 7, an example of a service menu that the main service center 1 can send to a local service center can include the indicated information, developed from the user request that the main service center has received and from database information. The service menu can be sent to the local service center(s) automatically, or an operator can review it and click the send button to send it.

Returning again to FIG. 5, the relevant local service center(s) 3 determine whether to accept the service request and send an appropriate communication to the main service center 1 which, at step S7, determines if a response has been received. If step S7 determines that a response has not yet been received (a no answer at step S7), step S8 determines if a time-out period has passed. If the answer at S8 is no, the process returns to step S7; if the answer at step S8 is yes, step S9 sends a message to the user, for example via e-mail, that the pertinent local service center 3 is currently unavailable, possibly with a request that the user try again later, and the process ends. Similarly, if the main service center 1 receives a response from the pertinent local service center (a yes answer at step S7), but step S10 determines that the response is that the local service center is not available (a no answer at S10), the process goes to step S9 and ends.

If the computer 13 at the main service center receives a response to the effect that the pertinent local service center accepts the service request (a yes answer at step S10), or the answer at step S3*c* is yes, the main service center 1 transmits the service menu (see FIG. 7) to the user at step S12, together with information identifying the selected local service center(s) able and willing to meet the user's request. If the choice of two or more suitable local service centers is presented to the user, the user may manually select one and transmit this information to the main service center. As an alternative, the computer 13 can select a single local service center based on the user request and the database information and responses from contacted local service centers. As another alternative, an operator for the main service center can make the selection based on similar or different factors and enter the selection manually through a personal computer or otherwise. Further, the computer 13 can select the most suitable local service center automatically, and transmit the service request only to that local service center, thereby omitting the step of sending the service request to other suitable local service centers.

In this example, if several local service centers that receive a service request from the main service center 1 can accept the request, they transmit the "service acceptable" response to the main service center. If only one local service center can accept the request, it can transmit its response directly to the user, as an alternative to transmitting it to the main service center.

After the service menu and the identity of the suitable local service center(s) have been transmitted to the user at step S12, the main service center checks at step S13 if a final service request has been received from the user to confirm the request and, if needed, select one of several suitable local service centers. If the answer at step S13 is no, the process checks at step S14 if a time-out period has elapsed. If the time-out has elapsed, the process checks at step S15 if a reminder has been sent to the user and, if no reminder has been sent, goes to step S16 to send such a reminder. If step S15 determines that a reminder has been sent to user, the process at step S17 sends information to the local service center(s) to cancel the request for service, and the process ends.

If the computer 13 receives a final service request from the user, i.e, the answer at step S13 is yes, at step S18 it stores the pertinent user information from the service menu, including the user's identity and the identity of the selected service center, in a memory such as RAM 133 or a hard disc drive (HDD) and, further adds pertinent user information to a database such as 122. The storage in RAM 133 and/or HDD at step S18 can be temporary. At step S19, computer 13 sends the final service request to the appropriate local service center at local service center side 3 through the appropriate communication facility, and at step 20 can print a hard copy record of the pertinent service menu.

In this example, the transmission of a reminder at step S16, of a service request cancellation at step S17, and of a final service request at step S19 are executed automatically by the computer 13 or controller 131. As an alternative within the scope of the disclosed embodiments, such information can be transmitted under manual control, by an operator at a personal computer with a screen and a keyboard and/or mouse, or some other appliance having similar capabilities, operating at or from the main service center 1.

At step S21, the computer 13 checks whether information has been received from the pertinent local service center 3 that the requested service has been completed, e.g., that the relevant parts or supplies have been sent to the user or that the user's image forming device has been repaired. If the answer at S21 is no, step S22 checks if a timeout period of time has passed, e.g., a period related to the time the local service center 3 indicated as completion time in response to the request. If the relevant time period has not expired, the process returns to step S21; if it has, the process at step S23 sends an inquiry or reminder to the local service center 3 and returns to step S21. When step S21 determines that the service has been completed, the process at step S24 updates the user database, such as database 122, using for example information that was temporarily stored in RAM 133 and/or HDD, and ends.

Figure 8:
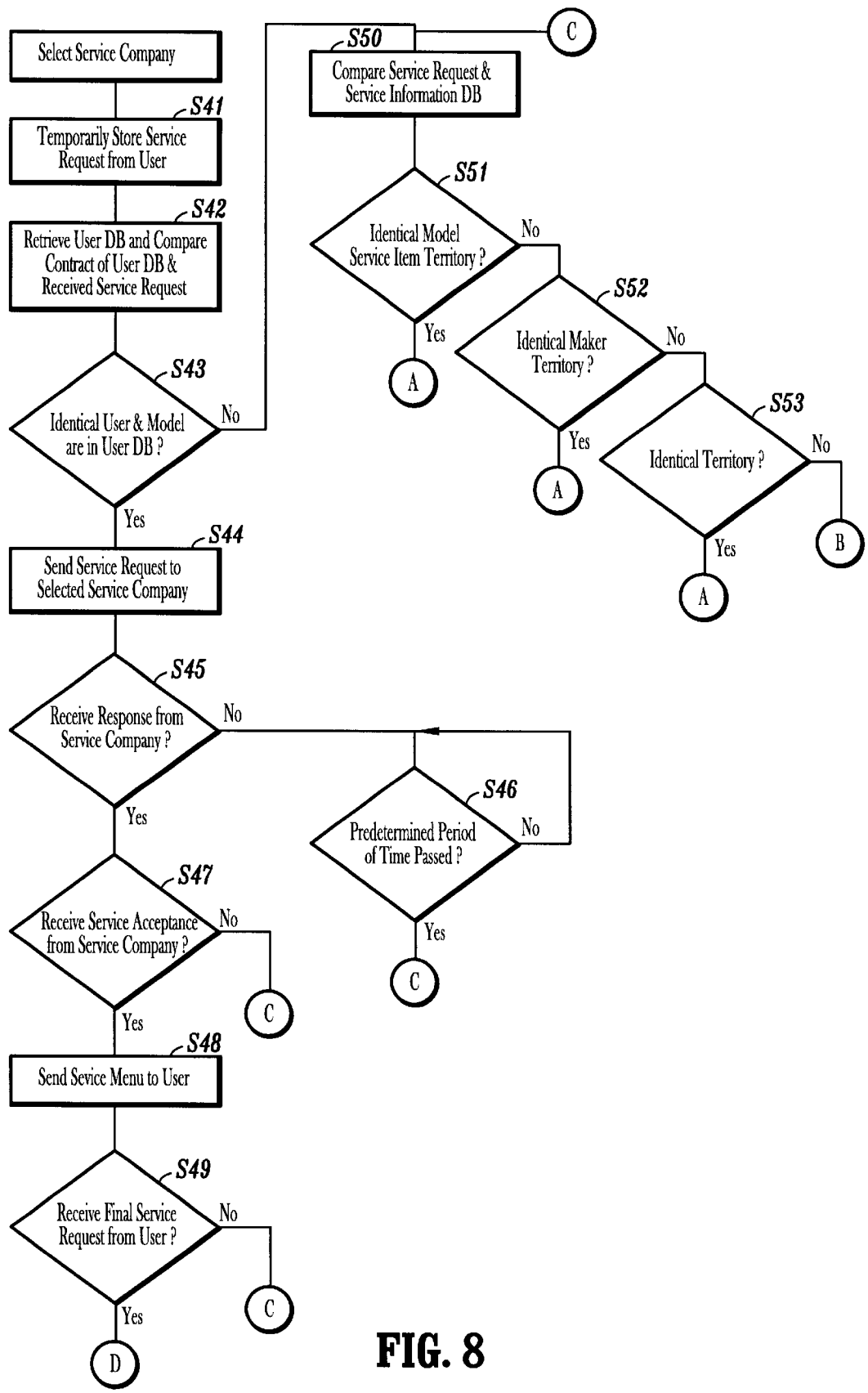
FIG. 8 is a flow chart illustrating an example of steps involved in a selection of a local service center that suits a user request.

FIG. 8 illustrated in greater detail an example of a process for selecting one or more local service centers 3 suitable for meeting a user's request, i.e., the process carried out at step S4 in FIG. 5. Referring to FIG. 8, the service request is stored at step S41, e.g., temporarily in RAM 133. At step S42, computer 13 compares information contained in the service request with information stored in a database such as 122, to look for a match between the user's identification and image forming device(s) on the one hand and information in the database on the other hand. If step S43 determines that a match was found, that means that at least one local service center is a candidate for meeting the user's request, and at step S44 the process sends the service request to the local service company that the match identified. At step S45 the process checks if a response has been received from the local service center 3 to which the service request was transmitted in step S44 and, if step S45 determines that a response was not received, checks at step S46 if a timeout period has elapsed. If the answer at step S46 is that the timeout period has elapsed, the process moves to step S50, discussed below. If the timeout has not elapsed, the process keeps making the test at step S46. If step S45 determines that the main service center 1 received a response from the selected local service center 3, the process moves to step S47 to check if the response was an acceptance of the service request. If the response was not an acceptance, the process moves to step S50.

If step S47 determines that the response from the local service center 3 was an acceptance, i.e., the local service center can meet the user's request, computer 13 transmits the service menu to the user at step S48 and checks at step S49 whether the main service center 1 has received the final, confirmed service request from the user. If the answer at step S49 is yes, the process moves to step S18 in FIG. 5; if the answer at step S49 is no, the process moves to step S50.

If any of the events leading to step S50 occurs, e.g., if the test at step S43 determines that the user name and image forming device identifications are not in a database such as 122, the process at step S50 compares information from the service request with information in a database such as 121 that pertains mainly to local service centers 3. At step S51, the process determines based on the results of the comparison at step S50, whether the image forming device identified in the service request can be serviced by a local service center 3 in a relevant territory, with respect to the desired service identified in the service request. If step S51 determines that the service request can be satisfied in terms of each of the particular model of image forming device, the particular service or need indicated, and the territory where the user is located, i.e., a yes answer at step S51, the process moves to step S5 in FIG. 5. If the answer at step S51 is no, i.e., the process checks at step S52 if there is a local service center 3 that covers the user's territory and services image forming devices made by the manufacturer of the image forming device identified in the service request. If the answer is yes, the process returns to step S5 in FIG. 5; if the answer at step S52 is no, the process checks at step S53 whether there is at least a local service center that covers the user's territory and, if the answer is yes, returns to step S5 in FIG. 5. If the answer at step S53 is no, the process returns to step S9 in FIG. 5.

Figure 9:
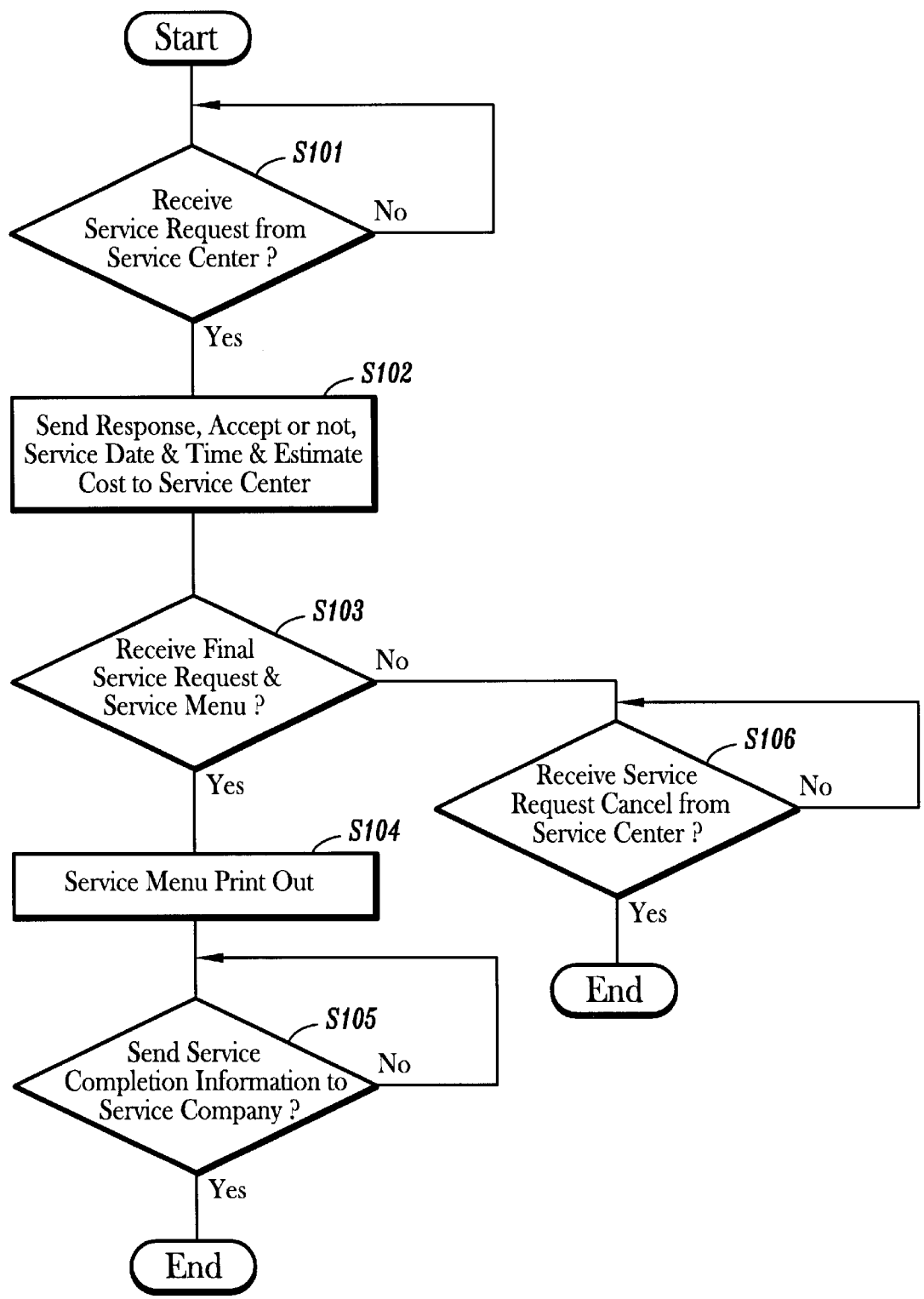
FIG. 9 is a flow chart illustrating an example of steps carried out in connection with processing a user request at a local service center.

FIG. 9 illustrates an example of an operation of a local service center 3 that is selectively connected with the main service center 1 and is registered in a database such as 121. A computer at the local service center 3 checks at step S101 whether it has received a service request from the main service center 1, e.g. as a result of step S6 in FIG. 5. If the answer at step S101 is no, the process cycles back through the same step. When the answer at step S101 is yes, the local service center 3 transmits at step S102 a response to the main service center 1 indicating whether or not the local service center can meet the service request. If it can meet the service request, the local service center further sends at step S102 additional information, such as the date and time it expects to meet the service request and an estimate of cost or charge to the user. At step S103, the local service center 3 checks if it has received a final service request and a service menu from the main service center 1. If the answer at step S103 is yes, the local service center can print out a hard copy of the service menu at step S104 and can carry out the requested service, e.g., dispatch a service person to service the user's image forming equipment on site, or send parts or supplies to the user, or carry out some other service. When the local service center determines that the service request has been met, it sends a "service completed" notification to the main service center 1 (and/or directly to the user), and the test at step S105 gives a yes answer and the process at the local service center ends. If at step S103 the answer is no, i.e., no final service request and service menu have been received, the local service center checks at step S106 if it has received a service cancellation notice from the main service center, and cycled through step S106 if the answer is no. If the answer at step S106 is yes, i.e., a service cancellation notice has been received, the process at the local service center 3 ends, to start again when another service request is received.

The above disclosure describes examples of implementation, but it should be clear that persons skilled in this technology can develop variations that are still within the scope of the disclosure and the appended patent claims, and that the disclosed embodiments and principles can be implemented in a variety of ways and that persons skilled in the technology can do so by following the disclosure above and filling in implementation details that, for the sake of conciseness and clarity, have not been expressly discussed. It should be noted further that while the main service center facilities can be at a single location, it is within the scope of the disclosed system and method to use a main service center that has portions at various locations that communicate to carry out the disclosed functions. For example, databases such as 121 and 122 need not be at the same location as computer 13, etc. Further, the main service center facilities disclosed above need not be used exclusively for the disclosed system and method. Similar considerations apply to the local service centers—it is not necessary that all facilities of a local service center be at a single location or used exclusively for the system and method disclosed above.

What is claimed is:

1. A method of servicing image forming devices comprising:

storing a local service center database information for a main service center, said information identifying at least a plurality of local service centers and image forming devices and manufacturers thereof that respective local service centers service;

receiving a service request from a user at the main service center, said service request including information identifying an image forming device for which service is requested, via a communication link selectively connecting the user and the main service center;

processing information from the service request received at the main service center and information from the database stored for the main service center to select at least one local service center that can meet the service request and is suitable for meeting the request.

2. A method as in claim 1 in which the processing comprises creating a service menu including information indicative at least of the user's identity and location, a manufacturer and model of the image forming device for which service is requested, and service items included in the service request.

3. A method as in claim 2 further including sending a service request from the main service center to at least one of the local service centers selected in said processing, via a communication link selectively connecting the main service center and said at least one selected local service center.

4. A method as in claim 3 further including sending responses from the one or more selected local service centers to the main service center containing information as to whether a selected local service accepts the service requests sent thereto from the main service center.

5. A method as in claim 4 further including receiving said responses sent by the one or more local service centers to the main service center indicative of acceptance of the service request, and identifying from among the responding one or more local service centers a suitable local service center based at least on information regarding a territory serviced by respective local service centers, an identity of the image forming device for which service is requested, and service items available at respective local service centers.

6. A method as in claim 5 further including sending a final service request, including a service menu, from the main service center to the suitable local service center.

7. A method as in claim 6 further including sending completion information from the suitable local service center indicative of completion of the requested service.

8. A method as in claim 1 in which said service request includes a location address and an e-mail address of the user.

9. A method as in claim 1 in which said service request includes a name and phone number of the user, the model designation and year of manufacture of the image forming device, an identification of one or more service items, and account information.

10. A method as in claim 1 in which said local service center database information comprises information identifying territories for respective local service centers, and models of image forming devices that the respective local service centers service.

11. A method as in claim 1 further including storing a user database information for the main service center.

12. A method as in claim 11 in which the user database information included at least user names, location and e-mail addresses, and phone numbers, and identifications of manufacturers, years of manufacture and models of users' image forming devices, and any preferred local service centers for users, and any service items previously requested by users.

13. A method as in claim 12 further including sending information from a local service center that is servicing a user request to the main service center, indicative of a completion of the service request, and further including updating said user database information accordingly.

14. A method as in claim 13 further including updating said local service center database in response to said information indicative of a completion of the service request.

15. A field service system comprising:
a main service center;
a plurality of local service centers at locations remote from the main service center;
a plurality of image forming devices that are at user side remote from the main service center and from the local service centers, and a plurality of communication devices at the user side for selectively establishing a communication link between a user at the user side and the main service center to transmit thereto a service request indicative of one or more service items the user requests for one or more respective image forming devices;
said main service center including computer facilities and at least one local service center database storing information identifying at least local service centers and at image forming devices serviced by respective local service centers;
said local service centers being selectively connected with the main service center to exchange information therewith over respective communication links; and
said main service center being programmed to respond to a service request transmitted thereto from a user and to information stored in said local service center database to select a subset of said local service centers for meeting the service request.

16. A field service system as in claim 15 in which said main center includes computer facilities and programming creating a service menu including information indicative at least of the user's identity and location, a manufacturer and model of the image forming device for which service is requested, and service items included in the service request.

17. A field service system as in claim 16 in which the main service center includes computer facilities and programming sending the service request from the main service center to the selected subset of the local service centers, via a communication link selectively connecting the main service center and said selected subset.

18. A field service system as in claim 17 in which said selected subset of the local service centers includes computer facilities and programming sending responses to the main service center containing information on whether the local service(s) in the selected subset would accept the service requests sent thereto from the main service center.

19. A field service system as in claim 18 in which the main service center includes computer facilities and programming receiving one or more responses from the selected subset of local service centers to the main service center and to identify, from among the responding one or more local service centers, a suitable local service center based at least on information regarding a territory serviced by respective local service centers, an identity of the image forming device for which service is requested, and service items available at respective local service centers.

20. A field service system as in claim 18 in which the main service center includes computer facilities and programming sending a final service request, including a service menu, from the main service center to the suitable local service center.

21. A field service system as in claim 20 in which the local service centers include computer facilities and programming sending completion information indicative of completion of a service requested of and completed by respective local service centers.

22. A field service system as in claim 15 in which said service request includes a location address and an e-mail address of the user.

23. A field service system as in claim 22 in which said service request includes a name and phone number of the user, the model designation and year of manufacture of the image forming device, an identification of one or more service items, and account information.

24. A field service system as in claim 15 in which said local service center database information comprises information identifying territories for respective local service centers, and models of image forming devices that the respective local service centers service.

25. A field service system as in claim 15 in which said main service center comprises a user database.

26. A field service system as in claim 25 in which the user database stores information including at least user names, location and e-mail addresses, and phone numbers, and identifications of manufacturers, years of manufacture and models of users' image forming devices, and any preferred local service centers for users, and any service items previously requested by users.

27. A field service system as in claim 12 in which the local service centers include computer facilities and programming sending information to the main service center indicative of a completion of a service request directed thereto and completed thereby, and the main service center includes computer facilities and programming updating said user database accordingly.

28. A field service system as in claim 27 in which said main service center includes computer facilities and programming updating said local service center database in response to said information indicative of a completion of the service request.

29. A method of providing service for image forming devices comprising:

sending a service request from a user to a remotely located main service center, via a selectively established communication link, indicative of a request to service for an image forming device remote from the main service center;

said main service center receiving and processing the service request together with information from a user database and a local service database maintained for the main service center, to identify a subset of a plurality of local service centers that are remote from the user and the image forming device and from the main service center;

transmitting the service request together with a service menu from the main service center to the identified subset of local service center;

transmitting from the identified subset of local service center to the main service center responses indicative of whether the service request can be met;

processing said responses by the main service center to select a local service center within said subset to provide the service, and communicating information related to the selection to the user;

receiving a confirmation of a final service request from the user and communicating said final service request to the selected local service center; and sending completion of service information from the selected service center to the user.

30. A method as in claim 29 in which said responses sent by local service centers in response to a service request sent thereto by the main service center comprise information indicative of expected time of completion of the requested service and a cost estimate.

* * * * *